(12) United States Patent
Gotti et al.

(10) Patent No.: US 7,017,718 B2
(45) Date of Patent: Mar. 28, 2006

(54) COMPOSITE DISC FOR A DISC BRAKE HAVING A SPLITTABLE BRAKING BAND

(75) Inventors: Giovanni Gotti, Alme' (IT); Giovanni Mario Tironi, Dalmine (IT)

(73) Assignee: Freni Brembo S.p.A (IT)

( * ) Notice: Subject to any disclaimer, the term of this patent is extended or adjusted under 35 U.S.C. 154(b) by 209 days.

(21) Appl. No.: 10/481,701

(22) PCT Filed: Jun. 28, 2001

(86) PCT No.: PCT/IT01/00345

§ 371 (c)(1),
(2), (4) Date: Dec. 22, 2003

(87) PCT Pub. No.: WO03/002885

PCT Pub. Date: Jan. 9, 2003

(65) Prior Publication Data

US 2004/0149525 A1 Aug. 5, 2004

(51) Int. Cl.
*F16D 65/02* (2006.01)

(52) U.S. Cl. ............................ 188/218 XL
(58) Field of Classification Search ............ 188/205 A, 188/206 A, 206 R, 218 A, 218 R, 218 XL
See application file for complete search history.

(56) References Cited

U.S. PATENT DOCUMENTS

| | | | | |
|---|---|---|---|---|
| 3,314,509 A | * | 4/1967 | Pelikan ................. | 188/218 XL |
| 3,422,936 A | * | 1/1969 | Marcheron ............ | 188/218 XL |
| 3,885,659 A | * | 5/1975 | Smith ..................... | 192/107 R |
| 3,926,285 A | * | 12/1975 | Preller et al. .......... | 188/218 XL |
| 3,933,228 A | * | 1/1976 | Otto et al. ............. | 188/218 XL |
| 4,004,661 A | * | 1/1977 | Airheart et al. ........ | 188/218 XL |
| 4,132,294 A | * | 1/1979 | Poli ....................... | 188/218 XL |
| 5,788,026 A | * | 8/1998 | Poli ....................... | 188/218 XL |
| 5,864,935 A | * | 2/1999 | Baumgartner et al. ........ | 29/416 |

FOREIGN PATENT DOCUMENTS

| | | |
|---|---|---|
| DE | 1 800 161 | 4/1970 |
| DE | 1 775 685 | 9/1971 |
| DE | 93 19 491.9 | 3/1994 |
| DE | 198 39 763 | 5/2000 |
| EP | 1 091 137 | 4/2001 |

* cited by examiner

*Primary Examiner*—Christopher P. Schwartz
(74) *Attorney, Agent, or Firm*—Frommer Lawrence & Haug. LLP; John R. Lane

(57) ABSTRACT

In a composite disc for heavy-vehicle disc brakes, an annular braking band comprises at least two portions which are divided along at least one axial separation plane defining, on these portions, respective pairs of flat surfaces which can be arranged face to face in pairs. Radially-oriented, calibrated, semicylindrical cavities are formed in the flat coupling surfaces in order to define cylindrical seats for housing corresponding calibrated locating pins after the assembly of the portions of the band. This solution ensures precise axial alignment between the braking surfaces of the portions of the band.

8 Claims, 5 Drawing Sheets

COMPOSITE DISC FOR A DISC BRAKE HAVING A SPLITTABLE BRAKING BAND

BACKGROUND OF THE INVENTION

The present invention relates to a composite disc for a disc brake with a braking which can be split into at least two portions.

Composite disc brakes of the type indicated above are known and are particularly suitable for use on heavy vehicles for both road transport (lorries, commercial vehicles) and rail transport; in these disc brakes, the braking band comprises two portions which are connected to one another releasably so that they can be replaced when their braking surfaces are completely worn out, without the need to remove the bearing unit from the stub axle of the wheel. The need to use brake discs with easily removable braking bands is dictated by the fact that bearing manufacturers now guarantee a life which is much longer than that of brake discs, but upon the condition that the bearings are never demounted after the original assembly. The use of brake discs having braking bands which can be split into at least two portions has therefore been proposed for this purpose.

For a better understanding of the state of the art on the subject in question and of the problems inherent therein, two known solutions for the production of a composite disc-brake disc provided with a braking band which can be split into two portions will be described first of all.

In the description and in the appended claims, terms such as "axial", radial, and "tangential" are intended to refer to the condition of mounting on a vehicle or, preferably, to the axis of symmetry and/or of rotation of the disc.

A first embodiment of a disc brake of the type specified above is described in German patent application DE 2 301 246 from which FIG. 4 of the appended drawings is taken. With reference to this drawing, a braking band 3 of a composite ventilated disc 1 for a disc brake usable particularly in rail transport comprises a first portion 3a and a second portion 3b which are separate from one another. These portions, which have coupling surfaces lying in an axial dividing plane π, are placed side by side at the level of respective flat coupling surfaces 4a and 4b defined by this plane and are then joined together by tangentially-oriented, threaded connecting members 8. To ensure alignment between the two portions 3a, 3b of the braking band 3, two locating pins 6, also oriented tangentially, are inserted in respective cylindrical seats formed in the flat coupling surfaces 4a, 4b.

The main disadvantage of this solution is that it is impossible to ensure precise alignment between the two portions of the braking band, particularly axially, precisely because the task of ensuring this alignment is entrusted to a pair of tangential pins. The use of tangential locating pins in fact requires that their seats in the flat joining surfaces 4a, 4b be produced independently of one another. Owing to the working tolerances associated with the drilling of these seats, they are inevitably not positioned at the same distance (axially) from the two axially-opposed faces of the respective portions 3a, 3b. Thus, if the two portions of the band are assembled with the use of a pair of pins inserted in the above-mentioned tangential seats as a reference for their mutual alignment, the respective braking surfaces are not perfectly aligned with one another, particularly axially. That is, these surfaces do not define a single braking plane, but a step-like discontinuity arises between one surface and the other along the line of the join between the two portions of the band and, during braking, acts as a tool, removing material from the braking surfaces of pads housed in calipers, thus causing the pads to wear out rapidly.

A second method of producing a composite disc provided with a braking band which can be split into two portions is known from international patent application WO 93/21453; FIG. 5 of the appended drawings, in which parts and elements identical or corresponding to those of FIG. 4 have been attributed the same reference numerals, is taken from this application. In this case, the two portions 3a, 3b of the braking band 3 are formed by splitting in half, along a substantially diametral breakage line P, a band which has previously been produced by casting in a single piece. The band 3 is assembled by fitting the matching brittle breakage surfaces 4a, 4b of the two portions together and securing them by means of tangentially-oriented, threaded connection members 8.

However, this known solution is subject to the problem that it is difficult to control errors of shape (mainly the axial variation of the braking surfaces) which inevitably occur as a result of the deformations that are produced during the splitting of the band and which may lead to a considerable number of rejects in the manufacturing process.

SUMMARY OF THE INVENTION

The present invention proposes the provision of a composite brake disc which is provided with a braking band that can be split into at least two portions, and which can solve the above-mentioned problems and, in particular, can ensure precise alignment between the braking surfaces after the assembly of the portions.

This aim is achieved, according to the invention, by virtue of the fact that radial cavities are formed in the region of the coupling surfaces between the portions which make up the braking band, and can define radial cylindrical seats in which to house respective locating pins, as defined in independent claim 1.

BRIEF DESCRIPTION OF THE DRAWINGS

A preferred but non-limiting embodiment of the invention will be described below with reference to the appended drawings, in which.

DETAILED DESCRIPTION OF THE DRAWINGS

Figure 1A:
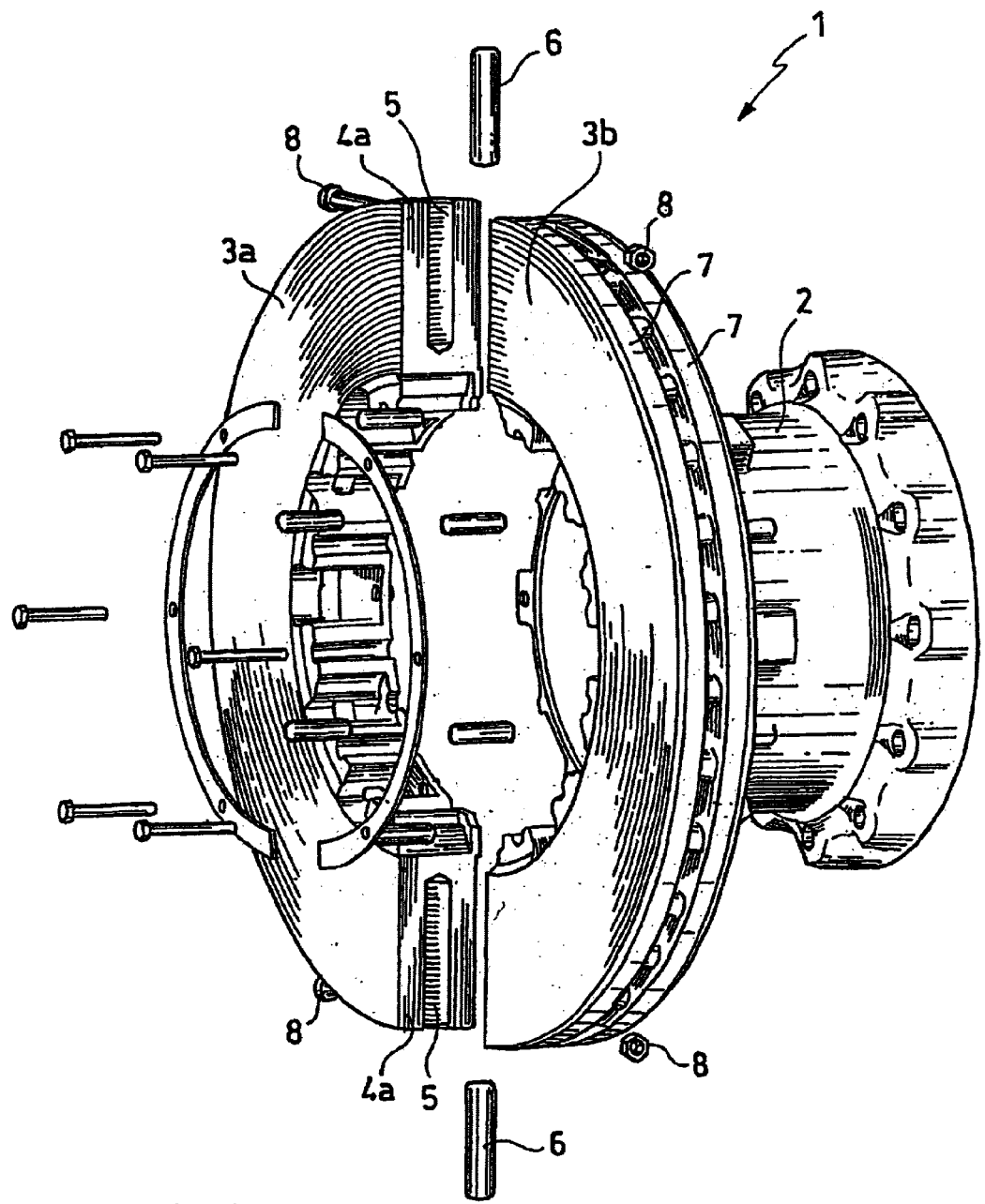
FIG. 1a is an exploded, perspective view of a composite disc-brake disc with a braking band which can be disassembled, according to the invention.
Figure 1B:
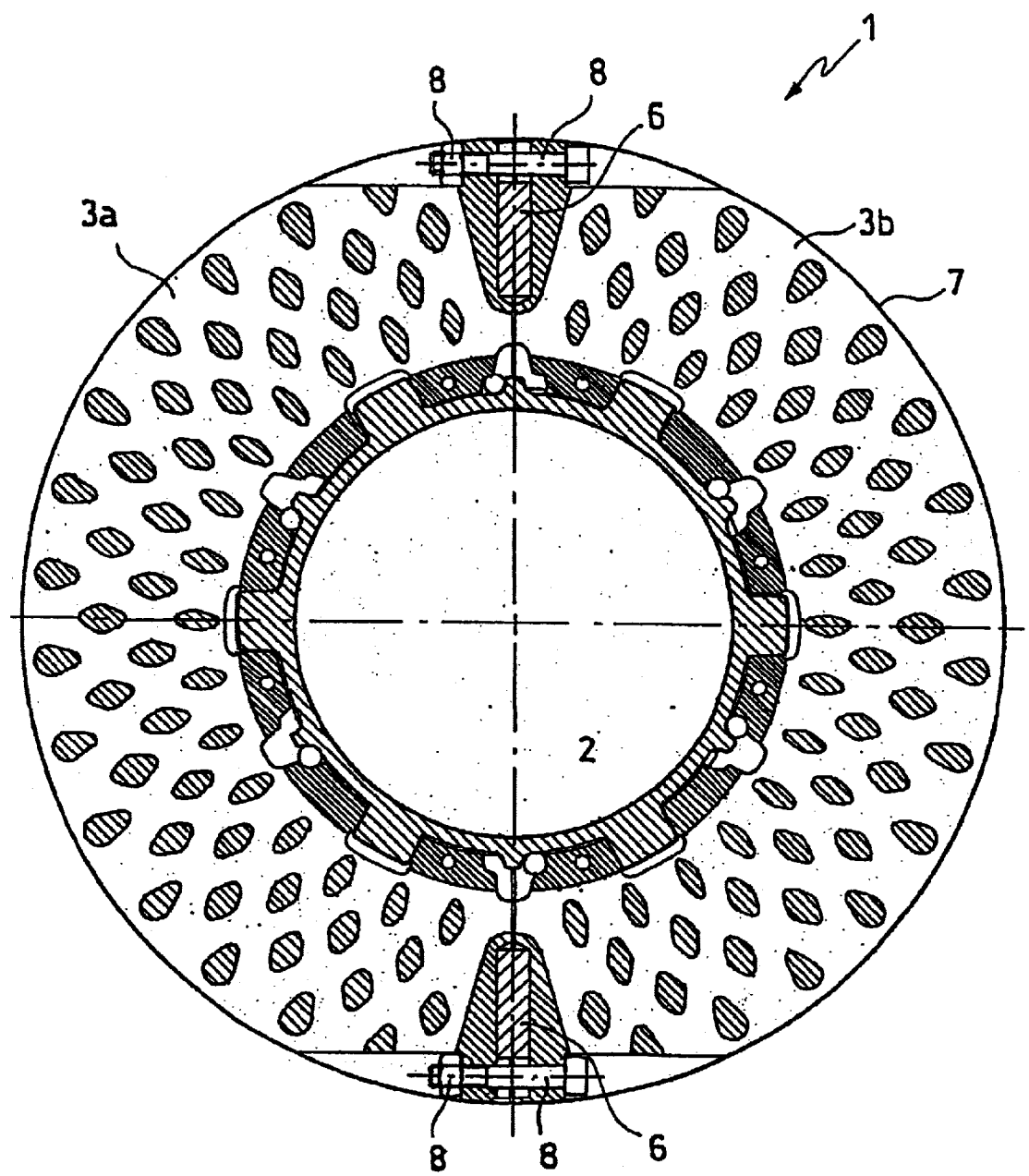
FIG. 1b is a front view of a composite disc-brake disc, sectioned in the transverse median plane of the disc.
Figure 2:
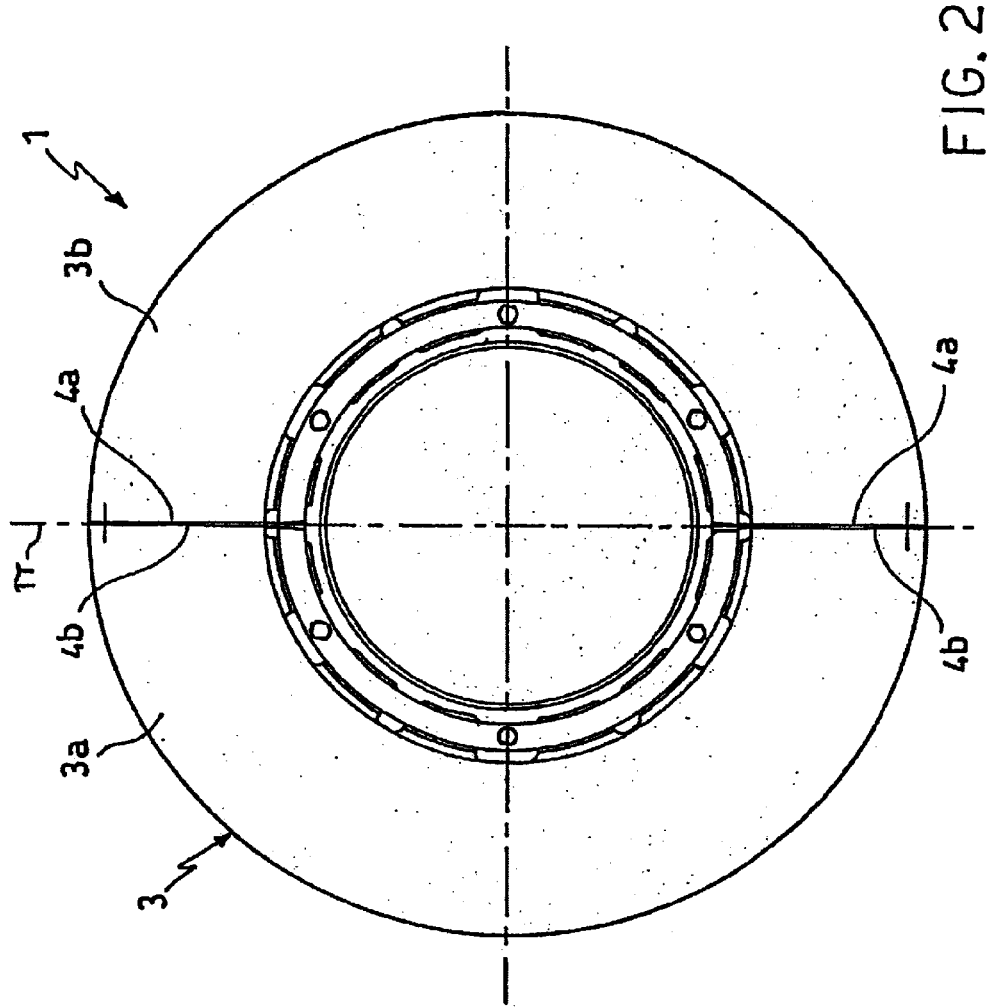
FIG. 2 is a front view of the disc of FIG. 1, assembled.
Figure 3:
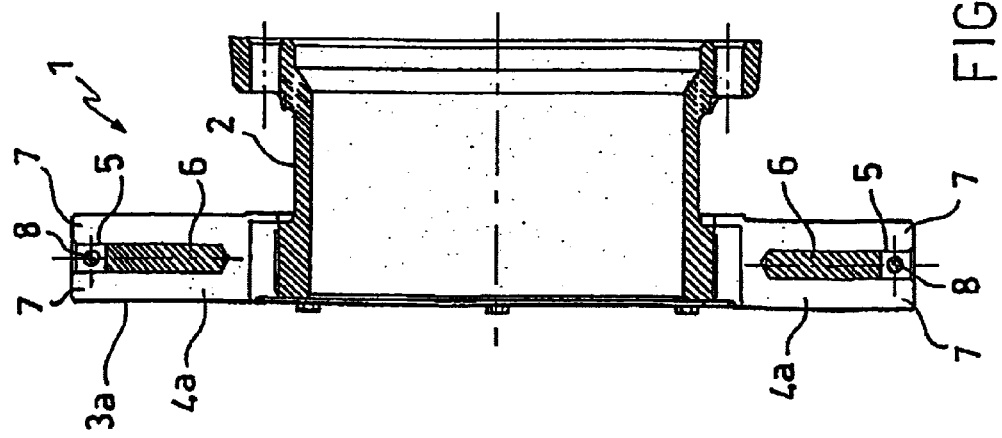
FIG. 3 is a view of the disc of FIG. 1, sectioned in the axial plane π dividing the two portions of the disc.
Figure 4:
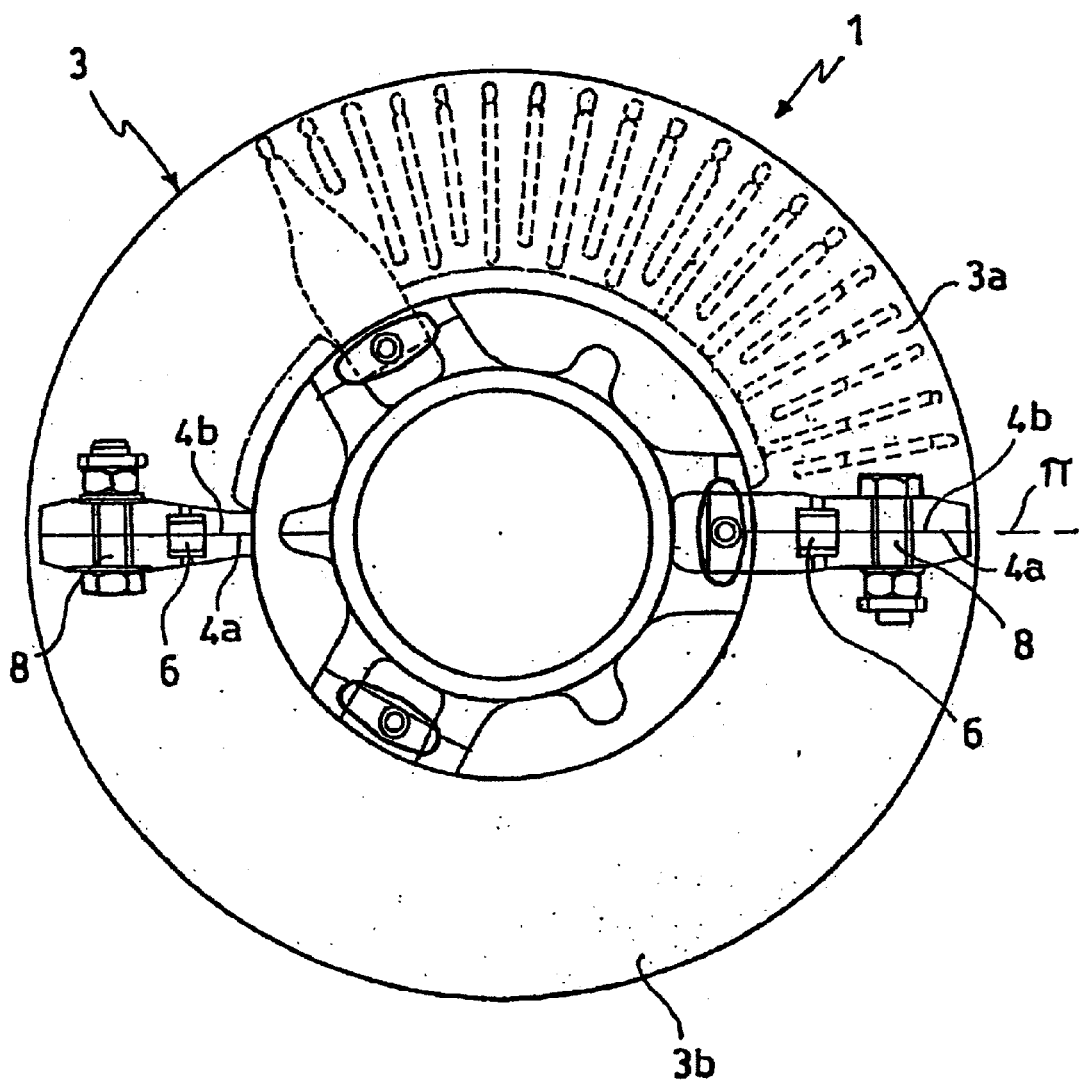
FIG. 4 is a front view of a first example of a composite disc-brake disc with a braking band which can be disassembled, according to the prior art.
Figure 5:
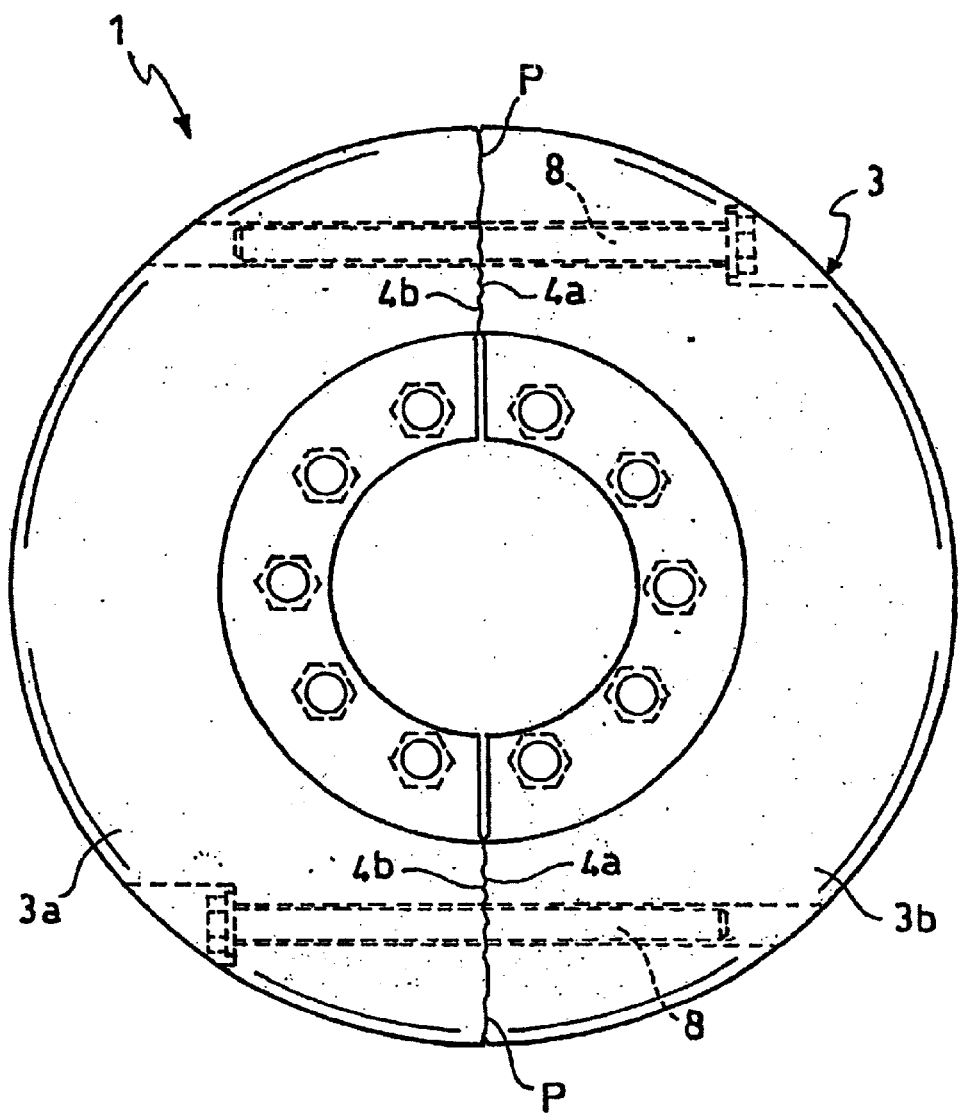
FIG. 5 is a front view of a second example of a composite disc-brake disc with a braking band which can be disassembled, according to the prior art.

As can be seen in FIGS. 1a to 3, in which parts and elements identical or corresponding to those of FIGS. 4 and 5 (prior art) have been attributed the same reference numerals, a composite disc 1 according to the present invention comprises a hub or bell 2 and a self-ventilating braking band 3 with two substantially annular, parallel plates or elements 7, connected to one another by connecting elements or projections of various radial extents (known per se).

The braking band 3 is divided by an axial dividing plane π into a first portion 3a and a second portion 3b which are substantially reflectively symmetrical and are assembled by arranging respective pairs of matching flat surfaces 4a, 4b face to face in diametrally opposed pairs.

To ensure axial alignment between the two portions 3a, 3b of the braking band 3, semicylindrical radial cavities 5 are formed in both of the flat coupling surfaces 4a, 4b and, in the assembled condition, define calibrated cylindrical seats for housing respective calibrated locating pins 6. Finally, the two portions of the band 3 are secured by threaded connection members 8 comprising a pair of screws housed in respective tangential holes formed in the radial connecting elements of the plates 7 and extending through the radial cavities 5 in the vicinity of the outside diameter of the band. These screws, which are arranged in radially outer positions relative to the locating pins 6 (FIG. 3), are fitted in the tangential holes in order to be locked therein by nuts after the insertion of the pins 6 in their radial, cylindrical seats 5.

The assembled unit appears as shown in FIGS. 2 and 3.

The method of manufacturing the braking band of a composite disc according to the invention provides basically for the following steps:

production of a whole braking band 3, fully machined in accordance with a normal processing cycle, blind radial drilling of the band 3, starting from two diametrally-opposed points on its outer surface, and calibration of the two holes 5 thus produced, formation of two tangential holes, which are preferably aligned with the median plane of the braking band 3 and disposed in diametrally-opposed positions in the vicinity of the outside diameter of the braking band, and through which the shanks of the screws 8 can extend, balancing of the braking band 3 in known manner and, finally, cutting of the braking band 3 in a plane π perpendicular to the median plane of the band and extending through the axes of the radial holes 5, for example, by a laser or water cutting method, to produce two portions 3a and 3b which can be fitted together.

The replacement of a braking band 3 according to the invention comprises the steps of:

removal of the worn braking band 3 substantially by the steps of:

removal of the fixing members 8, extraction of the calibrated pins 6 from the radial cylindrical seats 5, removal and separation of the first portion 3a of the braking band from the bell 2, rotation of the vehicle-wheel hub through approximately one half turn until the second portion 3b of the braking band 3 can be released, and removal of the second portion of the braking band 3 in the same manner as the first, and fitting of a new braking band 3, substantially by means of the steps of:

fitting of the first portion 3a of the braking band 3 on the bell 2, rotation of the vehicle-wheel hub through approximately one half turn until the first portion of the braking band 3 is brought to the region of the brake caliper, fitting of the second portion 3b of the braking band 3 in the same manner as the first, insertion of calibrated pins 6 in the radial cylindrical seats 5, and fitting and tightening of threaded connection members 8.

It is clear from the foregoing description that it is possible, according to the invention, to replace a worn braking band in a heavy vehicle without the need to demount the respective bearing unit.

Naturally, the principle of the invention remaining the same, the forms of embodiment and details of construction may be varied widely with respect to those described and illustrated purely by way of non-limiting example, without thereby departing from the scope of the invention as defined in the appended claims.

What is claimed is:

1. A composite disc-brake disc comprising:

a hub; and an annular braking band, said band comprising at least a first portion and a second portion, wherein said first portion and said second portion are divided along at least one axial separation plane such that respective pairs of flat surfaces are defined on the first and second portions and which can be arranged face to face in pairs in order to assemble the band, wherein the respective pairs of flat surfaces include respective cavities extending radially which define cylindrical seats extending radially when said first portion and said second portion are fixed together, said cylindrical seats house corresponding locating pins, and wherein said first portion and said second portion are fixed together by means of tangentially-oriented, threaded connecting members.

2. A disc according to claim 1, wherein said cylindrical seats and said locating pins are calibrated to the same diameter so as to ensure that the flat surfaces of said first portion and said second portion are coplanar.

3. A disc according to claim 1, wherein the locating pins are calibrated so as to be housed in the cylindrical seats without clearance.

4. A disc according to claim 1, wherein the respective cavities formed in the flat coupling surfaces of said first portion and said second portion are semicylindrical shape and are symmetrical in pairs, with respect to the axial separation plane.

5. An annular braking band for a composite disc-brake disc at least a first portion and a second portion, wherein said first portion and said second portion are divided along at least one axial separation plane such that respective pairs of flat surfaces are defined on the first and second portions and can be arranged face to face in order to assemble the band, wherein the respective pairs of flat surfaces include respective cavities extending radially which define cylindrical seats extending radially when said first portion and said second portion are fixed together, said cylindrical seats house corresponding locating pins, and wherein said first portion and said second portion are fixed together by means of tangentially-oriented, threaded connecting members.

6. A band according to claim 5 wherein said cylindrical seats and said locating pins are calibrated to the same diameter so as to ensure that the flat surfaces of said first portion and said second portion are coplanar.

7. A band according to claim 5 wherein the locating pins are calibrated so as to be housed in the cylindrical seats without clearance.

8. A band according to claim 5, wherein the respective cavities formed in the flat coupling surfaces of said first portion and said second portion are of a semicylindrical shape and are symmetrical in pairs, with respect to the axial separation plane.

\* \* \* \* \*